United States Patent
Sofia et al.

(10) Patent No.: US 11,368,287 B2
(45) Date of Patent: Jun. 21, 2022

(54) IDENTIFICATION OF A CREATOR OF AN ENCRYPTED OBJECT

(71) Applicant: INTERNATIONAL BUSINESS MACHINES CORPORATION, Armonk, NY (US)

(72) Inventors: Anthony Thomas Sofia, Hopewell Junction, NY (US); Christopher V. Derobertis, Hopewell Junction, NY (US); Jason G. Katonica, Glenmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 16/877,523

(22) Filed: May 19, 2020

(65) Prior Publication Data

US 2021/0367761 A1 Nov. 25, 2021

(51) Int. Cl.
*H04L 9/06* (2006.01)
*H04L 9/14* (2006.01)
*H04L 9/08* (2006.01)

(52) U.S. Cl.
CPC .......... *H04L 9/0637* (2013.01); *H04L 9/0631* (2013.01); *H04L 9/0643* (2013.01); *H04L 9/0866* (2013.01); *H04L 9/14* (2013.01)

(58) Field of Classification Search
CPC ... H04L 9/0637; H04L 9/0631; H04L 9/0643; H04L 9/0866; H04L 9/14
See application file for complete search history.

(56) References Cited

U.S. PATENT DOCUMENTS 9,552,493 B2  1/2017  Uzun
9,806,887 B1  10/2017 Campagna
(Continued)

FOREIGN PATENT DOCUMENTS

WO    2006015182 A2    2/2006

OTHER PUBLICATIONS

Bader, Ahmad S. et al. "Modification on AES-GCM to increment ciphertext randomness", https://www.researchgate.net/publication/328772514_Modification_on_AES-GCM_to_Increment_Ciphertext_Randomness, Nov. 2018, 8 pages.
(Continued)

*Primary Examiner* — Jeffrey C Pwu
*Assistant Examiner* — Mayasa A. Shaawat
(74) *Attorney, Agent, or Firm* — Cantor Colburn LLP; Edward Wixted

(57) ABSTRACT

Embodiments include encrypting an object such that the creator of the encrypted object can be identified. Aspects include receiving, by a processor, an unencrypted object that includes plaintext and metadata that describes the plaintext and obtaining, by the processor in response to a request from a user, a data encryption key (DEK) and a nonce key for the unencrypted object, the nonce key being unique to the user. Aspects also include encrypting, by the processor, the unencrypted object. The encrypting includes generating a nonce based at least in part of the plaintext and the nonce key and generating ciphertext and a metadata authentication tag comprising a signature of the metadata, the generating based at least in part on the plaintext, the metadata, the DEK, and the nonce. Aspects further include creating an encrypted object that includes the ciphertext, the metadata, and the metadata authentication tag.

18 Claims, 9 Drawing Sheets

(56) References Cited

U.S. PATENT DOCUMENTS

| | | |
|---|---|---|
| 10,015,144 B2 | 7/2018 | Katz et al. |
| 2010/0169645 A1 | 7/2010 | Mcgrew et al. |
| 2015/0082399 A1 | 3/2015 | Wu et al. |
| 2015/0244528 A1 | 8/2015 | Clayton et al. |
| 2015/0244529 A1 | 8/2015 | Clayton et al. |
| 2015/0280907 A1 | 10/2015 | Kocher et al. |
| 2017/0250796 A1 | 8/2017 | Samid |
| 2017/0250972 A1* | 8/2017 | Ronda .................. H04L 9/3236 |
| 2018/0054309 A1* | 2/2018 | Campagna ............ H04L 9/0822 |
| 2018/0075253 A1 | 3/2018 | Auh |
| 2018/0159681 A1 | 6/2018 | Molter et al. |
| 2018/0287789 A1 | 10/2018 | Sridharan |
| 2019/0132118 A1 | 5/2019 | Ghosh et al. |
| 2019/0356468 A1 | 11/2019 | Zeh et al. |
| 2020/0336470 A1 | 10/2020 | Kravitz |

OTHER PUBLICATIONS

Gueron, Shay et al., "Better bounds for block cipher modes of operation via nonce-based key derivation", https://acmccs.github.io/papers/p1019-gueronA.pdf, Oct. 30-Nov. 3, 2017, 18 pages.

IBM "List of IBM Patents or Patent Applications Treated as Related"; (Appendix P), Filed May 19, 2020, 2 pages.

Sofia, Anthony Thomas et al., Pending U.S. Appl. No. 16/812,494 entitled "Consistent Ciphertext Creation," filed Mar. 9, 2020.

The Audiopedia, "What is Cryptographic Nonce? What does Cryptographic Nonce mean? Cryptographic Nonce meaning," https://www.youtube.com/watch?v=KPCY31Jf9XU (Retrieved Aug. 15, 2017), 3 pages.

International Search Report; International Application No. PCT CN2021/082667; International Filing Date: Mar. 24, 2021; dated Jun. 17, 2021; 10 pages.

\* cited by examiner

IDENTIFICATION OF A CREATOR OF AN ENCRYPTED OBJECT

BACKGROUND

The present invention generally relates to encrypting data, and more specifically, to encrypting data using a data encryption key (DEK) such that the creator of an encrypted object can be identified.

The Advanced Encryption Standard (AES) specifies a cryptographic algorithm that can be used to protect electronic data. The AES algorithm is a symmetric block cipher that can encrypt (encipher) and decrypt (decipher) information. Encryption converts data into an unintelligible form referred to as ciphertext and decrypting the ciphertext converts the data back into its original form which is referred to as plaintext. The AES algorithm is capable of using cryptographic keys of 128, 192, and 256 bits to encrypt and decrypt data in blocks of 128 bits.

AES with Galois/Counter Mode (AES-GCM) provides both authenticated encryption (confidentiality and authentication) and the ability to check the integrity and authentication of additional authenticated data (AAD) that is sent in the clear (i.e., without encryption). There are four inputs to AES-GCM encryption: the key (e.g., an AES key, or DEK); the initialization vector (IV) (also referred to as a "nonce"); the plaintext; and optional AAD. The nonce and AAD are passed through in the clear, that is they are output from the AES-GCM encryption in the same format that they were input to the AES-GCM encryption. There are two additional outputs from the AES-GCM encryption: the cipher text, which is the same length as the plaintext; and when AAD is input to the encryption, an authentication tag which is used to authenticate the AAD.

AES-GCM is a stream cipher, and as such it requires that a different IV be used for each stream that is encrypted using the DEK. Thus, each time that the same plaintext value is encrypted with the same DEK using AES-GCM, it will result in a different ciphertext value.

SUMMARY

Embodiments of the present invention are directed to encrypting an object such that the creator of the encrypted object can be identified. A non-limiting example computer-implemented method includes receiving, by a processor, an unencrypted object that includes plaintext and metadata that describes the plaintext and obtaining, by the processor in response to a request from a user, a data encryption key (DEK) and a nonce key for the unencrypted object, the nonce key being unique to the user. The method also includes encrypting, by the processor, the unencrypted object. The encrypting includes generating a nonce based at least in part of the plaintext and the nonce key and generating ciphertext and a metadata authentication tag comprising a signature of the metadata, the generating based at least in part on the plaintext, the metadata, the DEK, and the nonce. The method further includes creating an encrypted object that includes the ciphertext, the metadata, and the metadata authentication tag.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
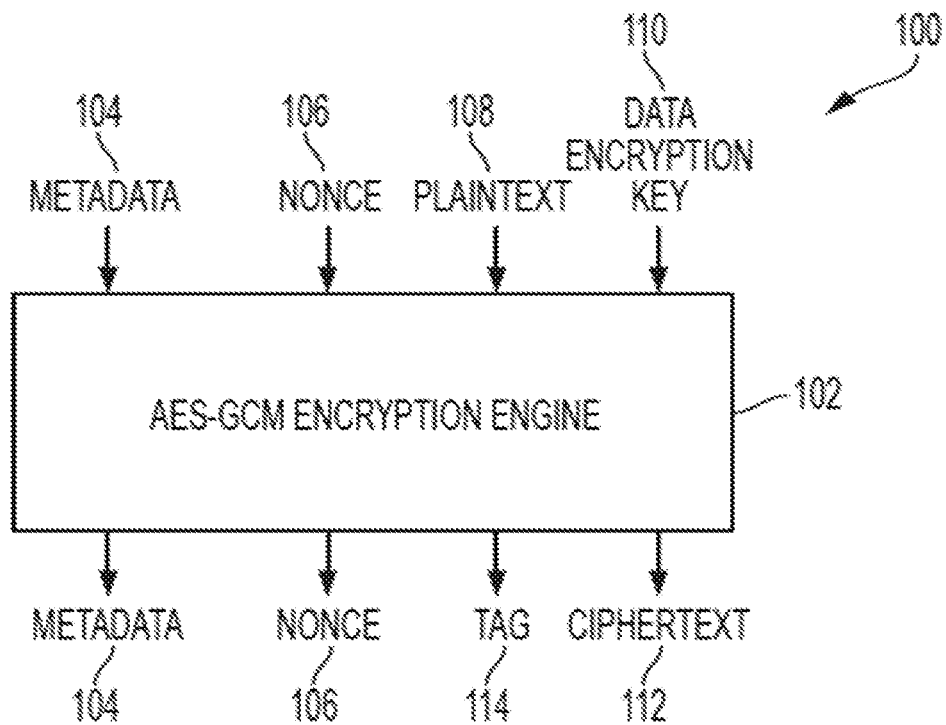
FIG. 1 depicts a block diagram of an encryption engine according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide the ability to encrypt an object such that the creator of the encrypted object can be identified. In accordance with one or more embodiments of the present invention, Advanced Encryption Standard with Galois/Counter Mode (AES-GCM) with an authentication tag is implemented in a manner that the creator of an encrypted object can be determined. This is performed without compromising the strength of the ciphertext generated by the AES-GCM algorithm.

The AES-GCM algorithm with an authentication tag can be used to bind clear (unencrypted) metadata to ciphertext. As known in the art, each AES-GCM operation, or encryption, for a given DEK requires a unique nonce as input to the encryption operation along with the DEK and the plaintext to be encrypted. That is, a set of nonce values used with any DEK must not contain any duplicate values. Using the same nonce for two different messages encrypted with the same DEK impacts the security properties of the AES-GCM encryption. Thus, each time that the same plaintext value is encrypted using AES-GCM, it will result in a different ciphertext value even when the same DEK is used. The nonce used to perform the encryption also needs to be known by the decryption algorithm in order for the cipher text to be decrypted back into the plaintext. Having nonce keys that are unique to each user, as provided by one or more embodiments described herein, allows for the creator of an encrypted object to be determined. For example, a single DEK may be linked to a plurality of different nonce keys, which are each different from one another and are each associated with different users. In some embodiments, a single nonce key is prohibited from being linked to two or more different DEKs.

As used herein, an "object" includes plaintext (or ciphertext if the object is encrypted) and metadata describing the plaintext. Examples of metadata include, but are not limited to a name, or label, of the plaintext data (e.g., "address", "department number", "first name", etc.); and/or a characteristic of the plaintext (e.g., integer, string, etc.).

In accordance with one or more embodiments of the present invention, as DEKs are defined, partner keys, referred to herein as "nonce keys", are also created. In accordance with one or more embodiments of the present invention, an object includes or is linked to a DEK, one or more nonce keys, and a nonce that is generated based on the nonce keys and the plaintext included in the object. In accordance with one or more other embodiments of the present invention, the object is linked to a DEK and the DEK is linked to the nonce key. The system receiving the object does not need access to the nonce key to perform the decryption, as only the system that is creating the object, and thus the nonce, requires access to the nonce key. In accordance with one or more embodiments of the present invention, the number of bits in the plaintext is equal to the number of bits in the ciphertext. In an embodiment, where the AES-GCM cryptographic algorithm is being utilized, a nonce having 96 bits will need to be generated and this can be performed using an AES with Cipher-based Message Authentication Code (AES-CMAC) encryption algorithm. The AES-CMAC algorithm takes as input the plaintext and the nonce key and outputs the nonce. Other encryption algorithms can also be used to generate the nonce, and the encryption algorithm used can vary for example, based on the number of bits in the nonce.

In accordance with one or more embodiments of the present invention, the generated nonce is input into the AES-GCM algorithm, along with the DEK, associated metadata and the same plaintext used during the nonce generated phase. The final message, or encrypted object, output from the AES-GCM algorithm is the ciphertext and tag, as well as the associated metadata (unchanged from the metadata that was input) and the generated nonce.

In this manner, the final package is generated in such a way that the DEK does not get re-used as part of the nonce generation process, which keeps its usage specific to the single AES-GCM operation. The use of the nonce derivation described herein provides that a nonce will not be re-used across different plaintext messages (which would compromise the integrity of the AES-GCM algorithm). In addition, the decryption and validation phase is a single operation. The AES-GCM algorithm is re-run with the ciphertext, tag, nonce, and associated metadata (clear text), which are all part of the object, or message, that is output from the encryption.

One or more embodiments of the present invention provide the additional technical benefit that the nonce generation is only performed one time when the object, or message is created. For applications where the object will be encrypted (e.g., stored) and decrypted many times, this provides a performance and resource utilization benefit in that nonce creation does not need to be done each time that the object is encrypted. Examples are described herein in terms of AES-GCM cryptographic algorithms; however, embodiments are not limited to AES-GCM and can be applied to other cryptographic algorithms that require unique nonces.

Turning now to FIG. 1, a block diagram 100 of an encryption engine is generally shown in accordance with one or more embodiments of the present invention. As shown in FIG. 1, plaintext 108 and metadata 104 describing the plaintext 108 are input to an AES-GCM encryption engine 102 along with a nonce 106 and a DEK 110. The AES-GCM encryption engine 102 can be executed, for example, on a processor 905 located on computer 901 of FIG. 9 or on a processor located on a cloud computing node 10 of FIG. 7, as further described herein.

In accordance with one or more embodiments of the present invention, the plaintext 108 and the metadata 104 are included in an unencrypted object. In addition, the nonce 106 and the DEK 110 are linked to the object, such that when the object is encrypted or decrypted, the linked nonce 106 and linked DEK 110 are input to the encryption and decryption algorithms. In accordance with one or more embodiments of the present invention, the linked nonce 106 and/or the linked DEK 110 are included in the object (e.g., via a pointer in the object or by being stored in the object). The nonce 106 is generated, as described below with reference to FIG. 3, prior to the encryption being performed by the AES-GCM encryption engine 102.

As shown in the embodiment of FIG. 1, outputs from the AES-GCM encryption engine 102 an encrypted object that includes ciphertext 112 and a tag 114 (also referred to herein as a "metadata authentication tag"). The tag 114 includes a signature of the metadata 104 that was input to the encryption process, and it is used by the decryption process to validate that the metadata 104 was not altered after it was input to the encryption process. The metadata 104 and the nonce 106, both unchanged from when they were input, are also output from the AES-GCM encryption engine 102. In an embodiment, the AES-GCM encryption engine 102 does not output the metadata 104 and/or the nonce 106, instead one or both are accessible via their inclusion in or link to the object.

Figure 2:
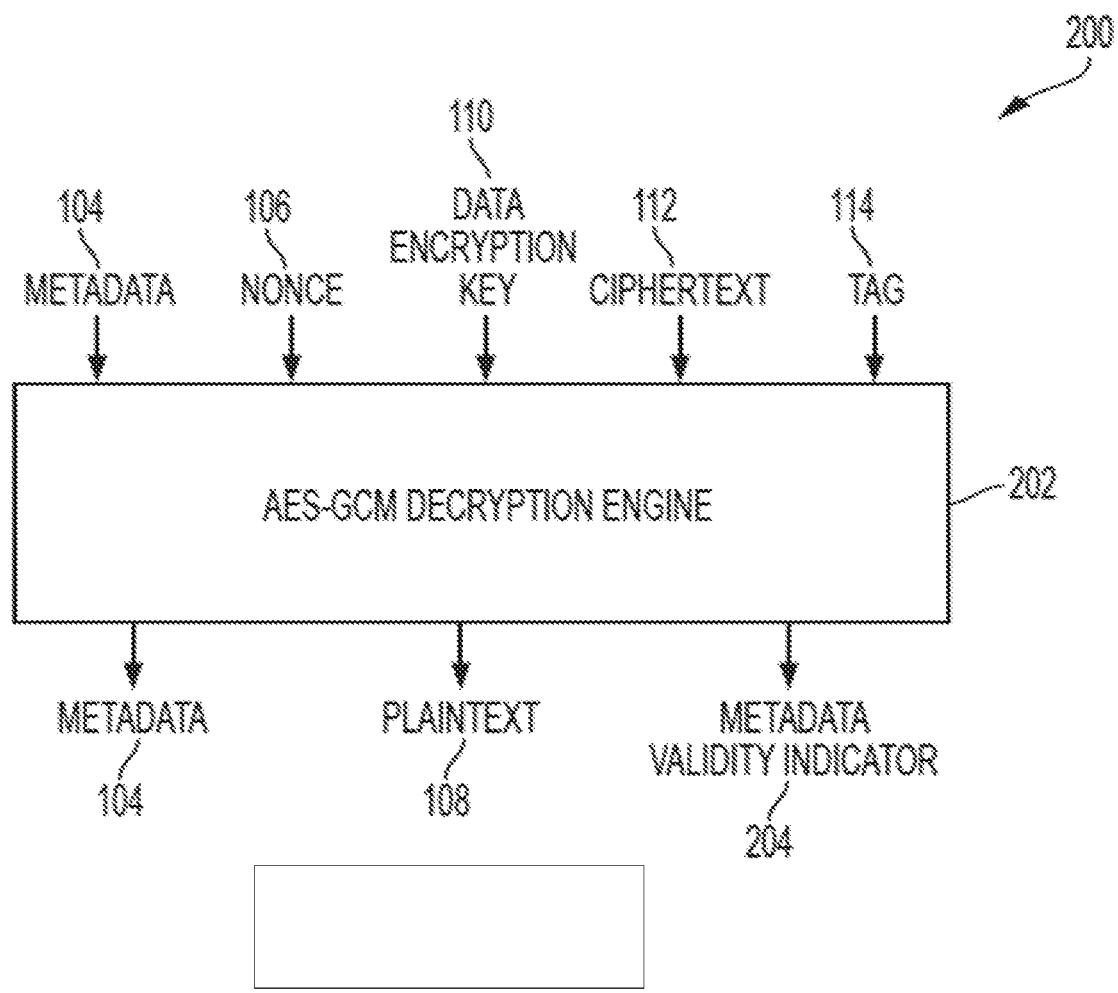
FIG. 2 depicts a block diagram of a decryption engine according to one or more embodiments of the present invention.

Turning now to FIG. 2, a block diagram 200 of a decryption engine is generally shown in accordance with one or more embodiments of the present invention. As shown in FIG. 2, encrypted object that includes the ciphertext 112 and the tag 114 generated by the AES-GCM encryption engine 102 of FIG. 1 is input to an AES-GCM decryption engine 202. Also input to the AES-GCM decryption engine 202 are the DEK 110, the nonce 106, and the metadata 104. The AES-GCM decryption engine 202 can be executed, for example, on a processor 905 located on computer 901 of FIG. 9 or on a processor located on a cloud computing node 10 of FIG. 7.

In accordance with one or more embodiments of the present invention, the ciphertext 112 generated by the AES-GCM encryption engine 102 is included in the encrypted object (e.g., via a pointer in the object or by being stored in the object) for input to the decryption algorithm. As shown in the embodiment of FIG. 2, outputs from the AES-GCM decryption engine 202 include an unencrypted object that includes plaintext 108, a metadata validity indicator 204, and the metadata 104. The metadata validity indicator 204 is used to verify that the metadata 104 has not been changed, that is that the metadata 104 output from the decryption process matches the metadata 104 that was input to the encryption process. Whether or not the metadata has been modified is reflected in the value of the metadata validity indicator 204. In an embodiment, the AES-GCM decryption engine 202 does not output the metadata 104, instead the metadata 104 is accessible via its inclusion in or link to the object.

Figure 3:
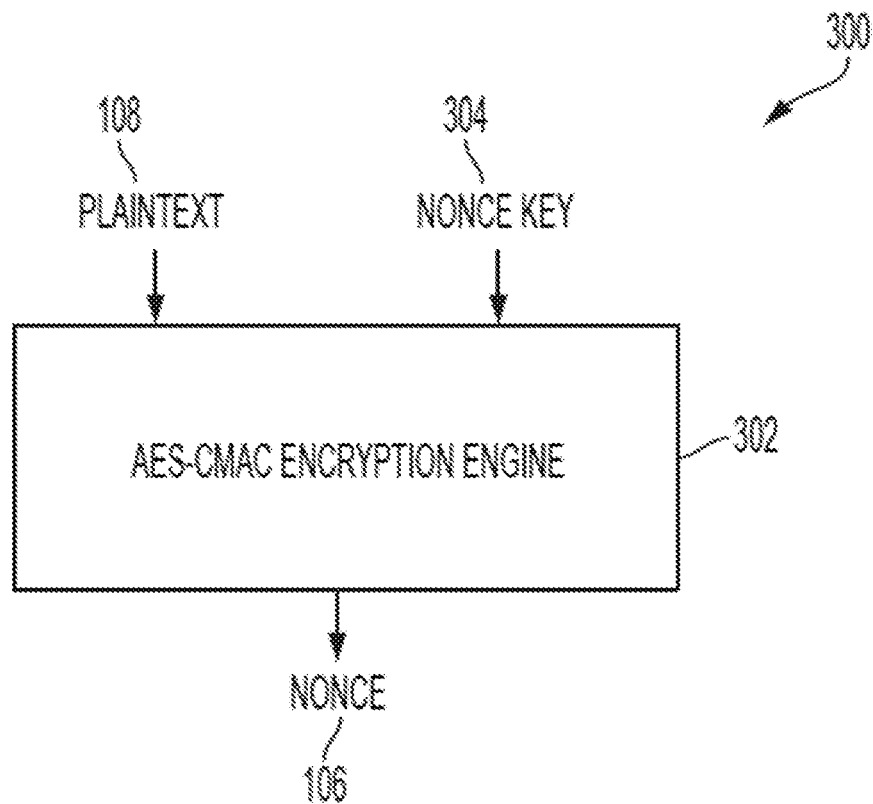
FIG. 3 depicts a block diagram of a nonce generation engine according to one or more embodiments of the present invention.

Turning now to FIG. 3, a block diagram 300 of a nonce generation engine is generally shown in accordance with one or more embodiments of the present invention. As shown in FIG. 3, a nonce key 304 and the plaintext 108 are input to an AES-CMAC encryption engine 302, and a nonce 106 for the plaintext 108 is generated. The AES-CMAC encryption engine 302 can be executed, for example, on a processor 905 located on computer 901 of FIG. 9 or on a processor located on a cloud computing node 10 of FIG. As described previously, embodiments of the nonce generation engine are not limited to AES-CMAC as shown in FIG. 3, as any encryption algorithm that generates a nonce of the length required by the particular encryption algorithm that is being used to encrypt and decrypt the plaintext can be implemented. In the example embodiment shown in FIG. 3, an AES-CMAC-96 encryption algorithm may be used to provide a nonce having a length of 96 bits for encrypting plaintext having a length of 96 bits.

As described previously, a plurality of nonce keys 304 for an object(s) can be paired with a DEK 110 for the object(s). Each of the plurality of nonce keys 304 is assigned to, or corresponds to, a specific user. In one embodiment of the present invention, the plurality of nonce keys 304 are created in response to the DEK 110 being created. In accordance with one or more embodiments of the present invention none of the nonce keys 304 can have the same value and none of the nonce keys can have the same value as the DEK 110.

The embodiments described herein with respect to block diagram 100 of FIG. 1, block diagram 200 of FIG. 2, and/or block diagram 300 of FIG. 3 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
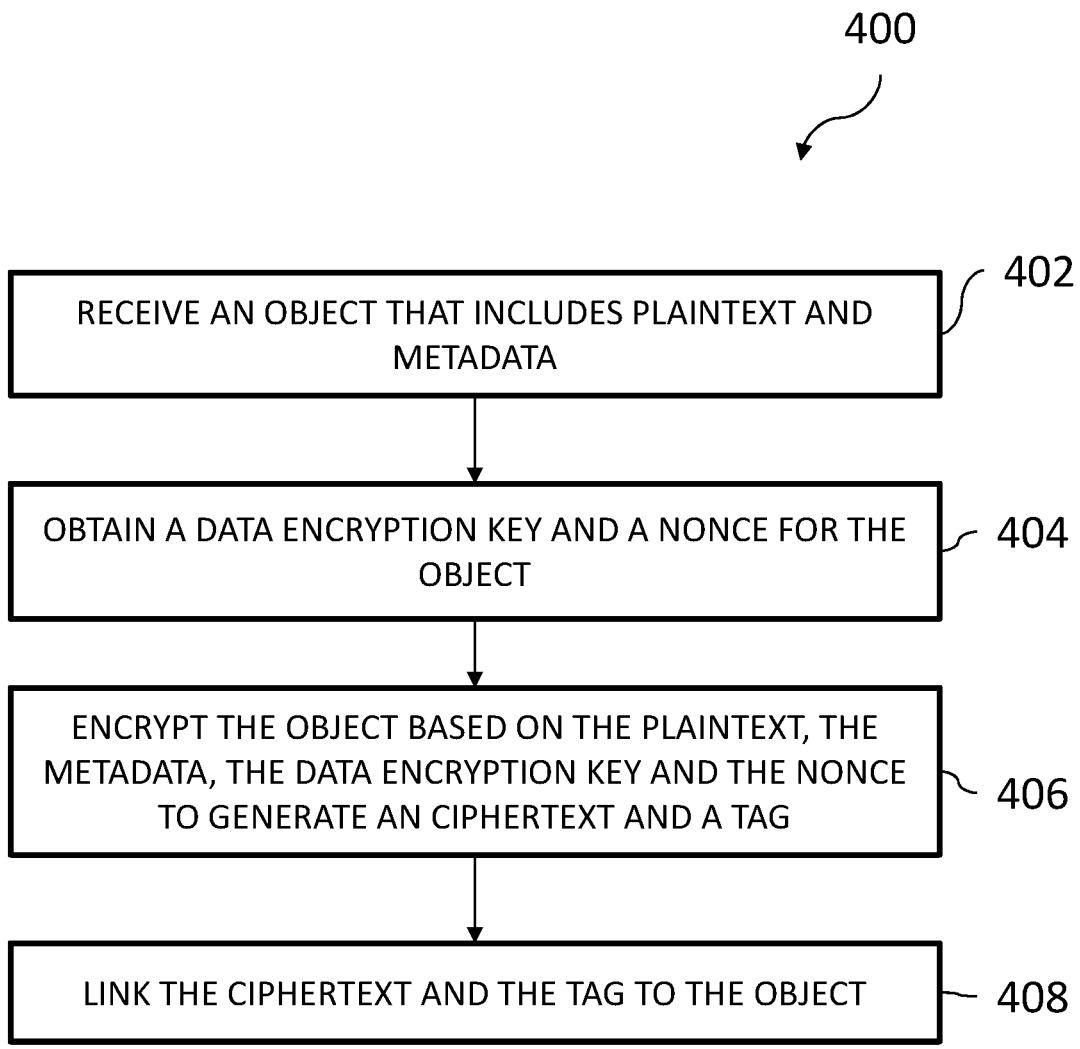
FIG. 4 depicts a flow diagram of a method for encrypting an object such that the creator of the encrypted object can be identified according to one or more embodiments of the present invention.

Turning now to FIG. 4, a flow diagram of a method 400 encrypting an object such that the creator of the encrypted object can be identified is generally shown in accordance with one or more embodiments of the present invention. All or a portion of the processing shown in FIG. 4 can be performed, for example, by a processor 905 located on computer 901 of FIG. 9 or on a processor located on a cloud computing node 10 of FIG. 7.

At block 402, an unencrypted object that includes plaintext and metadata is received by encryption engine, such as AES-GCM encryption engine 102 of FIG. 1. Next, as shown at block 404, a DEK and a nonce for the object are obtained by the encryption engine. In accordance with one or more embodiments of the present invention, the nonce was previously generated by a nonce generator engine, such as AES-CMAC encryption engine 302 of FIG. 3, based on the plaintext and a nonce key associated with the user performing the encryption. In accordance with one or more embodiments of the present invention, the nonce key for the object and the DEK have different values and are derived independently of the contents, or values, of each other.

In exemplary embodiments of the present invention, a plurality of nonce keys are created and linked to different users and to the object in response to detecting that the DEK has been created and linked to the object. In some embodiments, the nonce for the object is generated once in response to the object being created, and the nonce is linked to the object until the object is deleted or the plaintext in the object is modified. Next, as shown at block 406, the object is encrypted by the encryption engine. The encrypting can include generating ciphertext and a metadata authentication tag (includes a signature of the metadata) based on the plaintext, the metadata, the DEK, and the nonce. At block 408, the ciphertext and the metadata authentication tag are linked to or included in the object.

Figure 5:
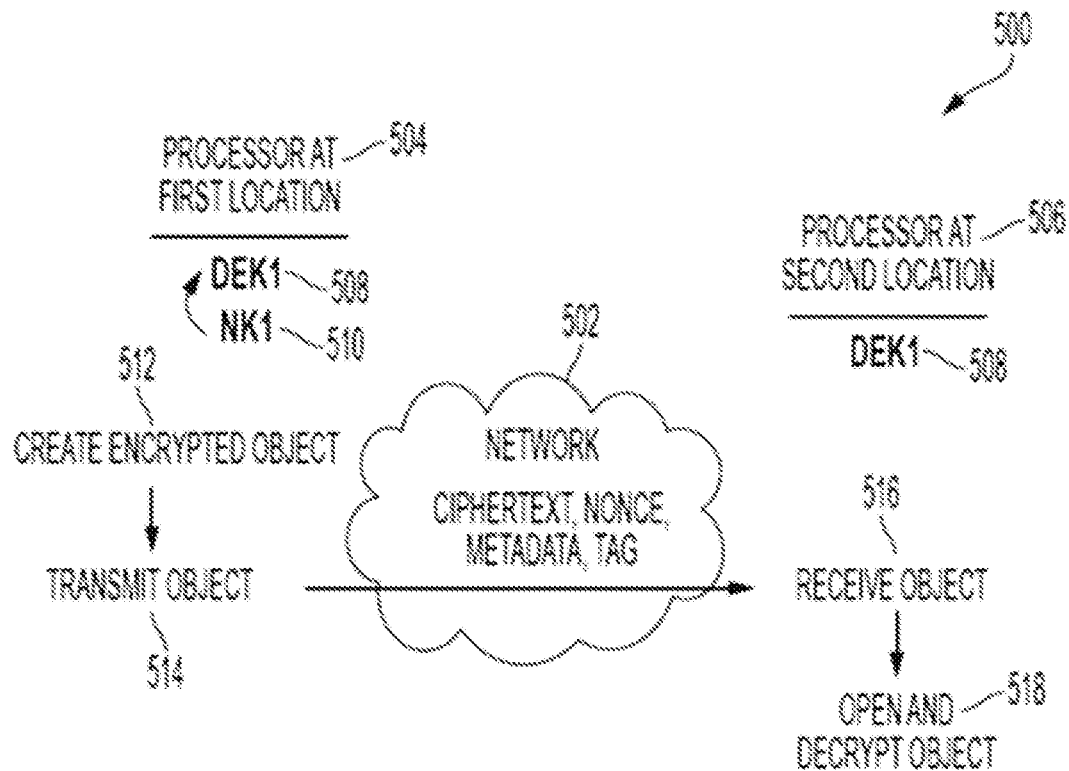
FIG. 5 depicts a distributed system environment for encrypting, transmitting and decrypting objects according to one or more embodiments of the present invention.

The process flow diagram of FIG. 4 is not intended to indicate that the operations of the method 200 are to be executed in any particular order, or that all of the operations of the method 200 are to be included in every case. Additionally, the method 200 can include any suitable number of additional operations Turning now to FIG. 5, a distributed system environment 500 for encrypting, transmitting, and decrypting objects is generally shown in accordance with one or more embodiments of the present invention. As shown in FIG. 5, a processor at a first location 504 and a processor at a second location 506 are in communication via a wired or wireless network 502. In other embodiments, the communication can be via a direct connection. As shown in FIG. 5, both processors have access to the DEK (DEK1 508) and the first processor has access to the nonce key (NK1 510) for the object.

As shown in FIG. 5, the processor at the first location 504 creates an encrypted object 512 including a ciphertext, a metadata, a tag, and a nonce. The nonce can be created as described above with respect to FIG. 3. The processor at the first location 504 transmits the encrypted object 514 including the ciphertext, the metadata, the tag and the nonce to the processor at the second location 506. The processor at the second location 506 receives the encrypted object 516 and then opens and decrypts the object 518 to create a decrypted object using the nonce that was transmitted as part of the object and DEK1 508. In accordance with one or more embodiments of the present invention, the processor at the first location 504 and/or the processor at the second location 506 are implemented by one or more processors located on a cloud computing node 10 of FIG. 7.

Figure 6:
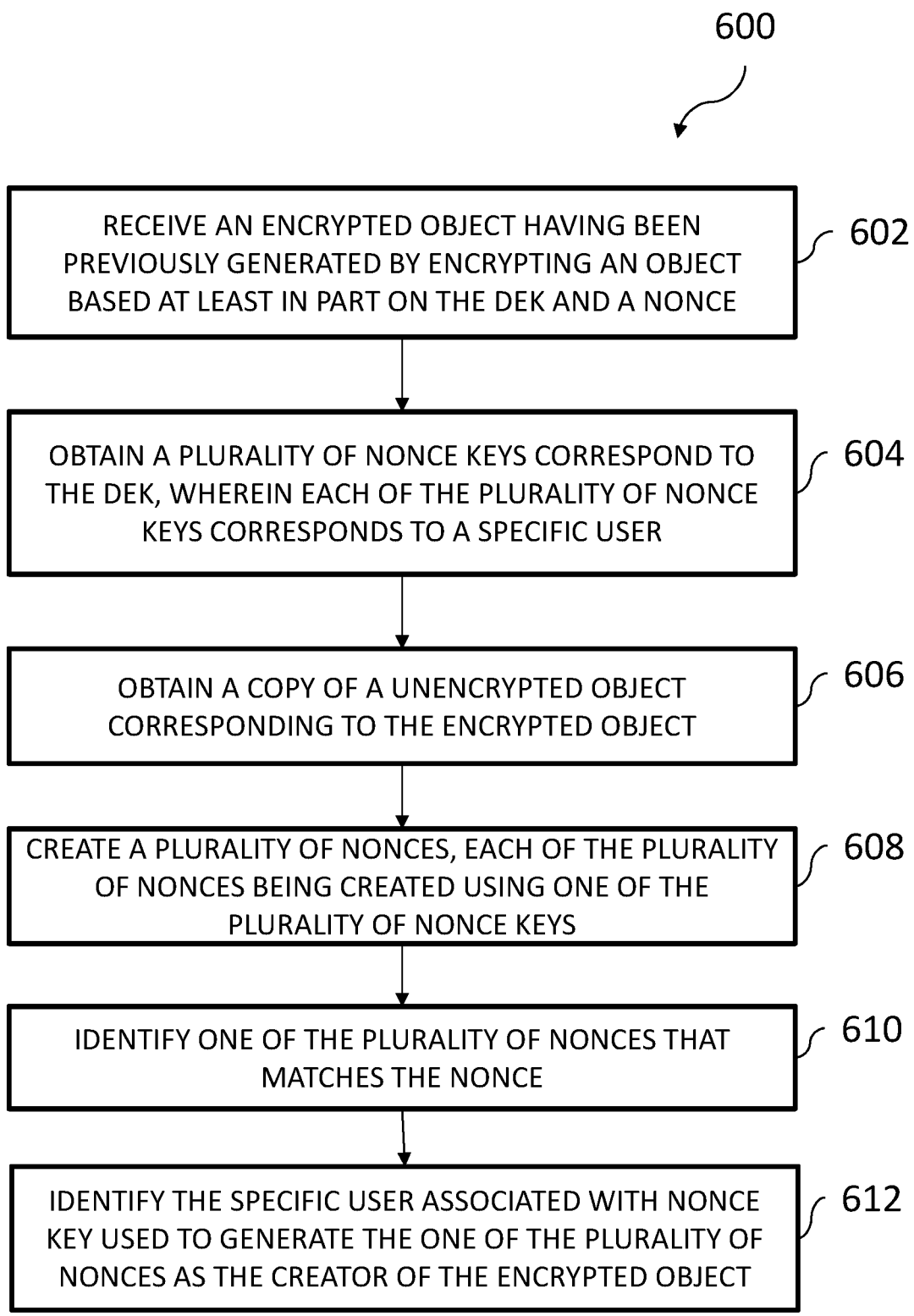
FIG. 6 depicts a flow diagram of a method for identifying a creator of an encrypted object according to one or more embodiments of the present invention.

Turning now to FIG. 6, a flow diagram of a method 600 for identifying a creator of an encrypted object is generally shown in accordance with one or more embodiments of the present invention. All or a portion of the processing shown in FIG. 6 can be performed, for example, by a processor 905 located on computer 901 of FIG. 9 or on a processor located on a cloud computing node 10 of FIG. 7.

As shown at block 602, the method 600 includes receiving an encrypted object having been previously generated by encrypting an object based at least in part on the DEK and a nonce. Next, as shown at block 604, the method 600 includes obtaining a plurality of nonce keys correspond to the DEK, wherein each of the plurality of nonce keys corresponds to a specific user. The method 600 also includes obtaining a copy of an unencrypted object corresponding to the encrypted object, as shown at block 606. In one embodiment, the unencrypted object corresponding to the encrypted object is obtained by decrypting the encrypted object.

In accordance with one or more embodiments of the present invention, the encrypted object including the DEK, the ciphertext, the metadata authentication tag, the object, the metadata, and the nonce are sent as input to a decryption engine, such as AES-GCM decryption engine 202 of FIG. 2. In accordance with one or more embodiments of the present invention, both the metadata and the nonce are sent as cleartext (in unencrypted form). The decryption engine outputs an unencrypted object that includes the plaintext, the metadata, and an indicator of metadata validity, such as metadata validity indicator 204 of FIG. 2.

Next, the method 600 includes creating a plurality of nonces, each of the plurality of nonces being created using one of the plurality of nonce keys, as shown at block 608. The method 600 then proceeds to block 610 and identifies one of the plurality of nonces that matches the nonce previously used to create the encrypted object. The method 600 concludes at block 612 by identifying the specific user associated with nonce key used to generate the one of the plurality of nonces as the creator of the encrypted object.

In exemplary embodiments, when a data encryption key (DEK) is no longer available, nonces for an object can be recalculated from the original clear data and the plurality of nonce keys. As a result, the nonce key, and the associated user, that was used to create the nonce can be identified. In exemplary embodiments, when a data breach has occurred, the data encryption key for an objected can be invalidated, thereby preventing all copies of the encrypted object from being accessed. However, the source of the data breach can be determined based on identifying the nonce key used to create the nonce associated with the leaked encrypted object.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
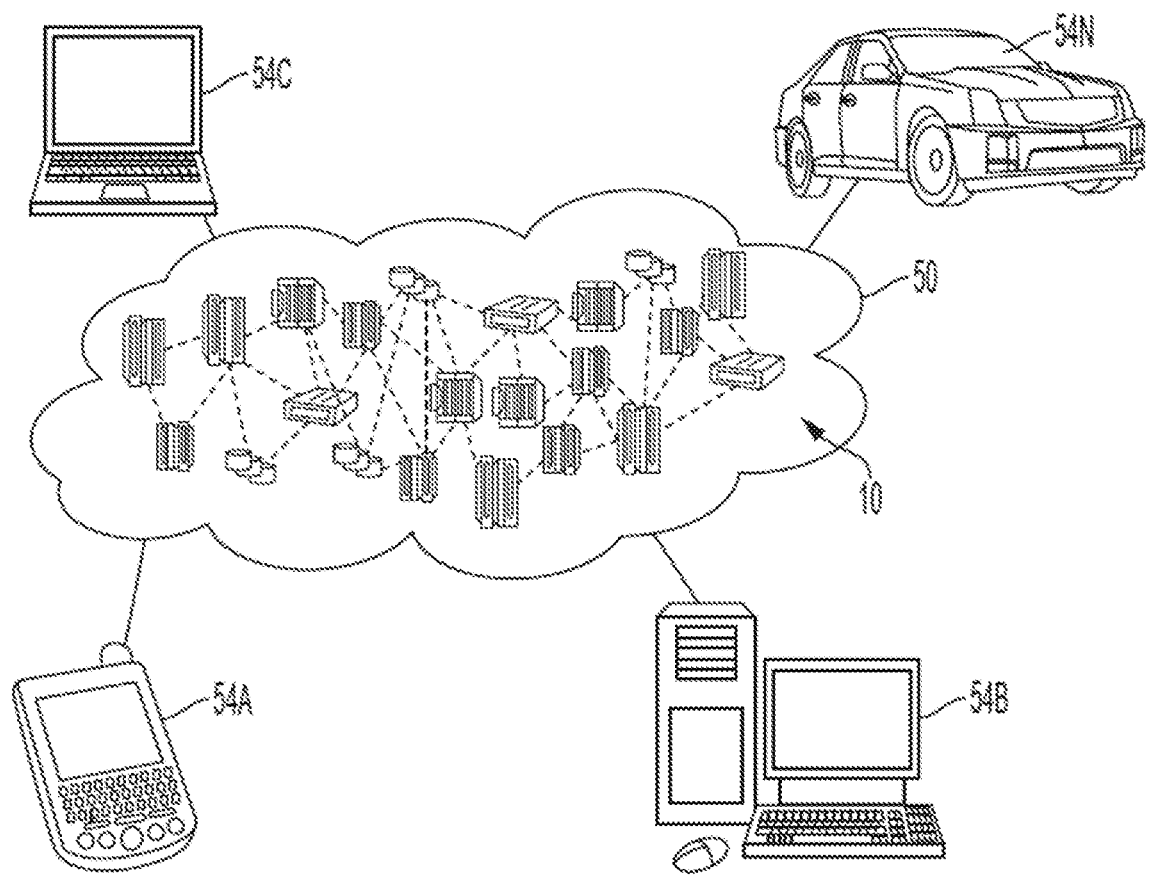
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
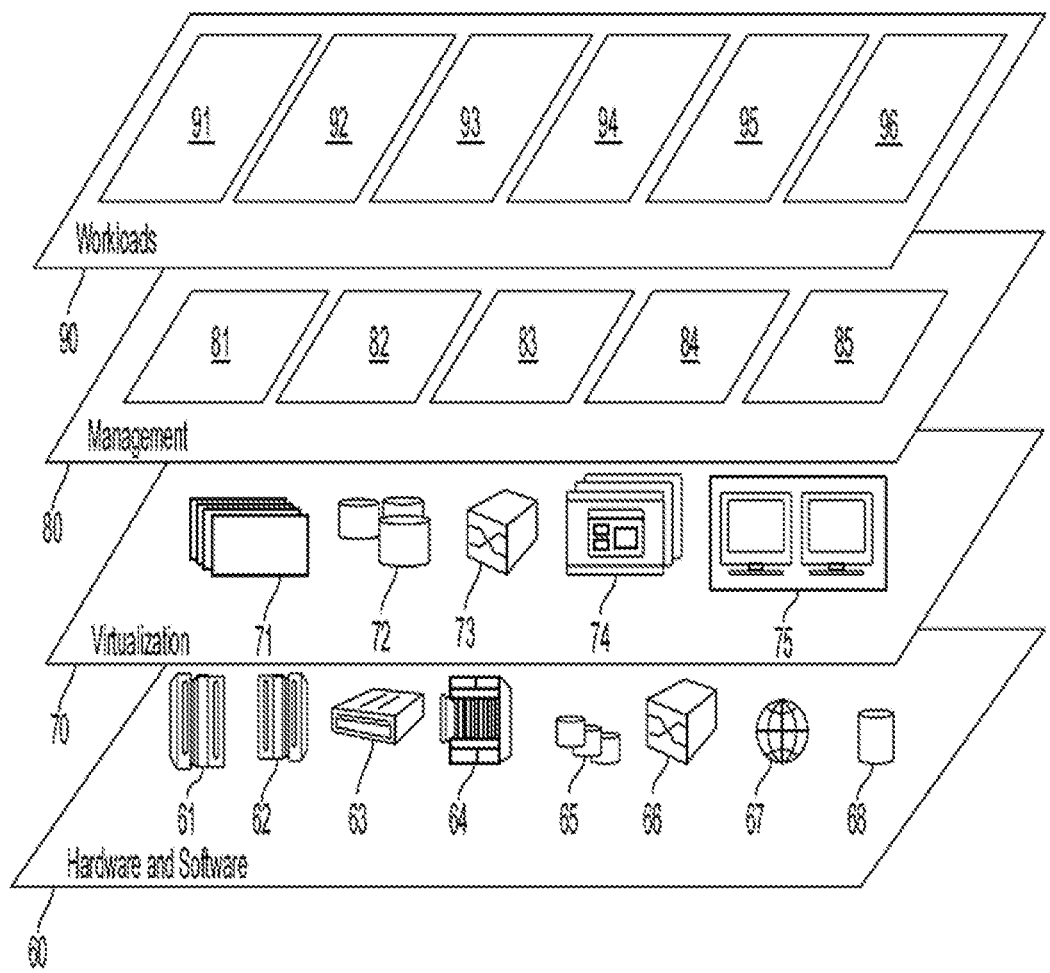
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 9:
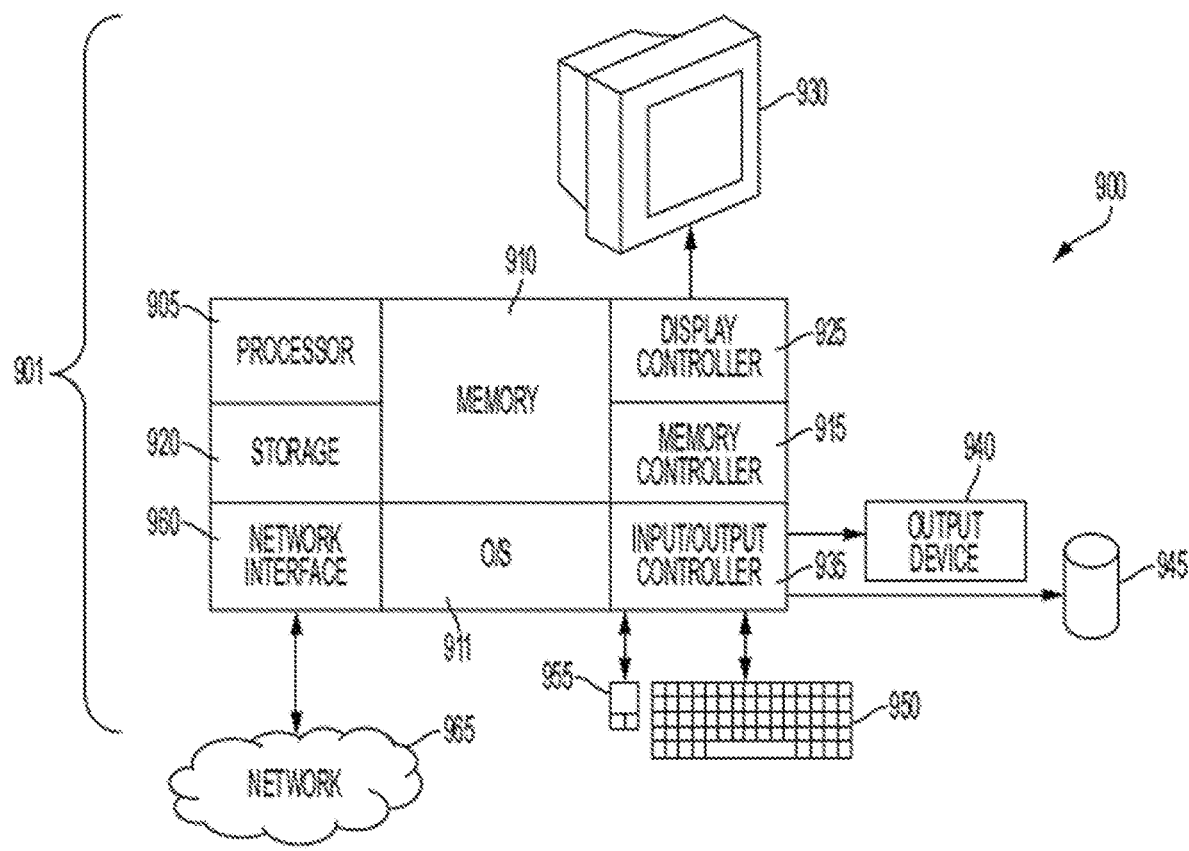
FIG. 9 illustrates a system for encrypting an object such that the creator of the encrypted object can be identified according to one or more embodiments of the present invention.

Turning now to FIG. 9, a computer system for encrypting an object such that the creator of the encrypted object can be identified is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 900 therefore may include general-purpose computer or mainframe 901 capable of running multiple instances of an O/S simultaneously.

In one or more exemplary embodiments of the present invention, in terms of hardware architecture, as shown in FIG. 9, the computer 901 includes one or more processors 905, memory 910 coupled to a memory controller 915, and one or more input and/or output (I/O) devices 940, 945 (or peripherals) that are communicatively coupled via a local input/output controller 935. The input/output controller 935 can be, for example but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 935 may include a plurality of sub-channels configured to access the output devices 940 and 945. The sub-channels may include fiber-optic communications ports.

The processor 905 is a hardware device for executing software, particularly that stored in storage 920, such as cache storage, or memory 910. The processor 905 can be any custom made or commercially available processor, a central processing unit (CPU), an auxiliary processor among several processors associated with the computer 901, a semiconductor based microprocessor (in the form of a microchip or chip set), a macroprocessor, or generally any device for executing instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, and/or other types of storage media. Note that the memory 910 can have a distributed architecture, where various components are situated remote from one another, but can be accessed by the processor 905.

The instructions in memory 910 may include one or more separate programs, each of which comprises an ordered listing of executable instructions for implementing logical functions. In the example of FIG. 9, the instructions in the memory 910 a suitable operating system (OS) 911. The operating system 911 essentially controls the execution of other computer programs and provides scheduling, input-output control, file and data management, memory management, and communication control and related services.

In accordance with one or more embodiments of the present invention, the memory 910 may include multiple logical partitions (LPARs) each running an instance of an operating system. The LPARs may be managed by a hypervisor, which may be a program stored in memory 910 and executed by the processor 905.

In one or more exemplary embodiments of the present invention, a conventional keyboard 950 and mouse 955 can be coupled to the input/output controller 935. Other output devices such as the I/O devices 940, 945 may include input devices, for example but not limited to a printer, a scanner, microphone, and the like. Finally, the I/O devices 940, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 900 can further include a display controller 925 coupled to a display 930.

In one or more exemplary embodiments of the present invention, the system 900 can further include a network interface 960 for coupling to a network 965. The network 965 can be an IP-based network for communication between the computer 901 and any external server, client and the like via a broadband connection. The network 965 transmits and receives data between the computer 901 and external systems. In an exemplary embodiment, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 901 is a PC, workstation, intelligent device or the like, the instructions in the memory 910 may further include a basic input output system (BIOS) (omitted for simplicity). The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to execute instructions stored within the memory 910, to communicate data to and from the memory 910, and to generally control operations of the computer 901 pursuant to the instructions. In accordance with one or more embodiments of the present invention, computer 901 is an example of a cloud computing node 10 of FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for encrypting an object such that the creator of the encrypted object can be identified comprising:
   receiving, by a processor, an unencrypted object that comprises plaintext and metadata that describes the plaintext;
   obtaining, by the processor in response to a request from a user, a data encryption key (DEK) and a nonce key for the unencrypted object, the nonce key being unique to the user, wherein a plurality of nonce keys correspond to the DEK, each of the plurality of nonce keys correspond to different users, and the nonce key is included in the plurality of nonce keys;
   encrypting, by the processor, the unencrypted object, the encrypting comprising:
      generating a nonce based at least in part of the plaintext and the nonce key; and
      generating ciphertext and a metadata authentication tag comprising a signature of the metadata, the generating based at least in part on the plaintext, the metadata, the DEK, and the nonce; and
      creating an encrypted object that includes the ciphertext, the metadata, and the metadata authentication tag.

2. The method of claim 1, wherein the nonce is generated once, and in response to the encrypted object being created the nonce is linked to the encrypted object via a pointer to the nonce in the encrypted object or linked to the encrypted object via inclusion of the nonce in the encrypted object.

3. The method of claim 1, wherein the generating the nonce comprises executing a nonce encryption algorithm that takes as input the plaintext and the nonce key, and that outputs the nonce.

4. The method of claim 3, wherein the nonce encryption algorithm is an Advanced Encryption Standard with Cipher-based Message Authentication Code (AES-CMAC) encryption algorithm.

5. The method of claim 1, wherein the encrypting the unencrypted object is performed using an Advanced Encryption Standard with Galois/Counter Mode (AES-GCM) encryption algorithm.

6. The method of claim 1, further comprising:
   receiving, by the processor, a second encrypted object, the second encrypted object having been previously generated by encrypting a second object based at least in part on the DEK and a second nonce;
   obtaining a plurality of nonce keys correspond to the DEK, wherein each of the plurality of nonce keys corresponds to a specific user;
   obtaining a copy of a second unencrypted object corresponding to the second encrypted object;
   creating a plurality of nonces, each of the plurality of nonces being created using one of the plurality of nonce keys;
   determining that one of the plurality of nonces that matches the second nonce and identifying the specific user associated with nonce key used to generate the one of the plurality of nonces as the creator of the second encrypted object.

7. The method of claim 6, wherein obtaining the copy of a second unencrypted object includes decrypting the second encrypted object using the DEK and the second nonce.

8. A system comprising:
   one or more processors for executing computer-readable instructions, the computer-readable instructions controlling the one or more processors to perform operations comprising:
   receiving an unencrypted object that comprises plaintext and metadata that describes the plaintext;
   obtaining, in response to a request from a user, a data encryption key (DEK) and a nonce key for the unencrypted object, the nonce key being unique to the user, wherein a plurality of nonce keys correspond to the DEK, each of the plurality of nonce keys correspond to different users, and the nonce key is included in the plurality of nonce keys;
   encrypting the unencrypted object, the encrypting comprising:
      generating a nonce based at least in part of the plaintext and the nonce key; and
      generating ciphertext and a metadata authentication tag comprising a signature of the metadata, the generating based at least in part on the plaintext, the metadata, the DEK, and the nonce; and
      creating an encrypted object that includes the ciphertext, the metadata, and the metadata authentication tag.

9. The system of claim 8, wherein the nonce is generated once, and in response to the encrypted object being created the nonce is linked to the encrypted object via a pointer to the nonce in the encrypted object or linked to the encrypted object via inclusion of the nonce in the encrypted object.

10. The system of claim 8, wherein the generating the nonce comprises executing a nonce encryption algorithm that takes as input the plaintext and the nonce key, and that outputs the nonce.

11. The system of claim 10, wherein the nonce encryption algorithm is an Advanced Encryption Standard with Cipher-based Message Authentication Code (AES-CMAC) encryption algorithm.

12. The system of claim 8, wherein the encrypting the unencrypted object is performed using an Advanced Encryption Standard with Galois/Counter Mode (AES-GCM) encryption algorithm.

13. The system of claim 8, wherein the operations further comprise:
receiving, by the processor, a second encrypted object, the second encrypted object having been previously generated by encrypting a second object based at least in part on the DEK and a second nonce;
obtaining a plurality of nonce keys correspond to the DEK, wherein each of the plurality of nonce keys corresponds to a specific user;
obtaining a copy of a second unencrypted object corresponding to the second encrypted object;
creating a plurality of nonces, each of the plurality of nonces being created using one of the plurality of nonce keys;
determining that one of the plurality of nonces that matches the second nonce and identifying the specific user associated with nonce key used to generate the one of the plurality of nonces as the creator of the second encrypted object.

14. The system of claim 13, wherein obtaining the copy of a second unencrypted object includes decrypting the second encrypted object using the DEK and the second nonce.

15. A computer program product comprising a computer-readable storage medium having program instructions embodied therewith, the program instructions executable by a processor to cause the processor to perform operations comprising:
receiving an unencrypted object that comprises plaintext and metadata that describes the plaintext;
obtaining, in response to a request from a user, a data encryption key (DEK) and a nonce key for the unencrypted object, the nonce key being unique to the user, wherein a plurality of nonce keys correspond to the DEK, each of the plurality of nonce keys correspond to different users, and the nonce key is included in the plurality of nonce keys;
encrypting the unencrypted object, the encrypting comprising:
generating a nonce based at least in part of the plaintext and the nonce key; and
generating ciphertext and a metadata authentication tag comprising a signature of the metadata, the generating based at least in part on the plaintext, the metadata, the DEK, and the nonce; and
creating an encrypted object that includes the ciphertext, the metadata, and the metadata authentication tag.

16. The computer program product of claim 15, wherein the nonce is generated once, and in response to the encrypted object being created the nonce is linked to the encrypted object via a pointer to the nonce in the encrypted object or linked to the encrypted object via inclusion of the nonce in the encrypted object.

17. The computer program product of claim 15, wherein the generating the nonce comprises executing a nonce encryption algorithm that takes as input the plaintext and the nonce key, and that outputs the nonce.

18. The computer program product of claim 17, wherein the nonce encryption algorithm is an Advanced Encryption Standard with Cipher-based Message Authentication Code (AES-CMAC) encryption algorithm.

* * * * *